United States Patent [19]
Sarno

[11] Patent Number: 5,683,155
[45] Date of Patent: Nov. 4, 1997

[54] HIDDEN TRACK FILE STORAGE SYSTEM

[76] Inventor: Richard L. Sarno, 5204 Guerin Pass, New Berlin, Wis. 53151

[21] Appl. No.: 640,557

[22] Filed: May 1, 1996

[51] Int. Cl.[6] .................................................. A47B 53/00
[52] U.S. Cl. ................................... 312/201; 312/198
[58] Field of Search .............................. 312/198, 199, 312/200, 201, 246

[56] References Cited

U.S. PATENT DOCUMENTS

| | | | |
|---|---|---|---|
| 4,084,125 | 4/1978 | King | 312/201 X |
| 4,123,126 | 10/1978 | Querengasser | 312/201 |
| 4,417,524 | 11/1983 | Quinn et al. | 105/101 |
| 5,205,627 | 4/1993 | Davison et al. | 312/201 |
| 5,443,312 | 8/1995 | Schluter | 312/201 X |

FOREIGN PATENT DOCUMENTS 2456080  8/1976  Germany ............................ 312/201

Primary Examiner—Peter M. Cuomo
Assistant Examiner—James O. Hansen
Attorney, Agent, or Firm—Andrus, Sceales, Starke & Sawall

[57] ABSTRACT

An apparatus for moving laterally accessible file storage or similar shelving units, from a stowed densely packed lateral array of such units, longitudinally to a full access position. The apparatus includes a wheeled carriage which travels over a flat supporting track laid in the path of the carriage as the unit is rolled longitudinally. The flexible track has a leveling feature which can accommodate uneven or varying level base floor surfaces. The flexible track is picked up by return movement of the carriage, leaving no exposed portion of the apparatus when the unit is stowed.

18 Claims, 9 Drawing Sheets

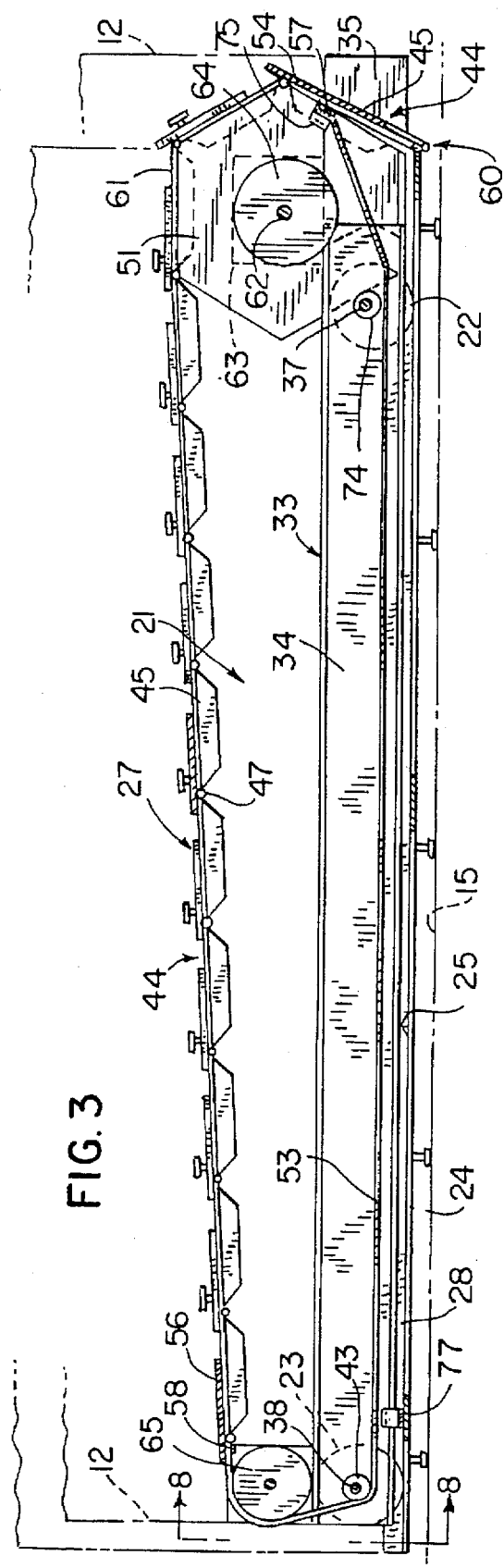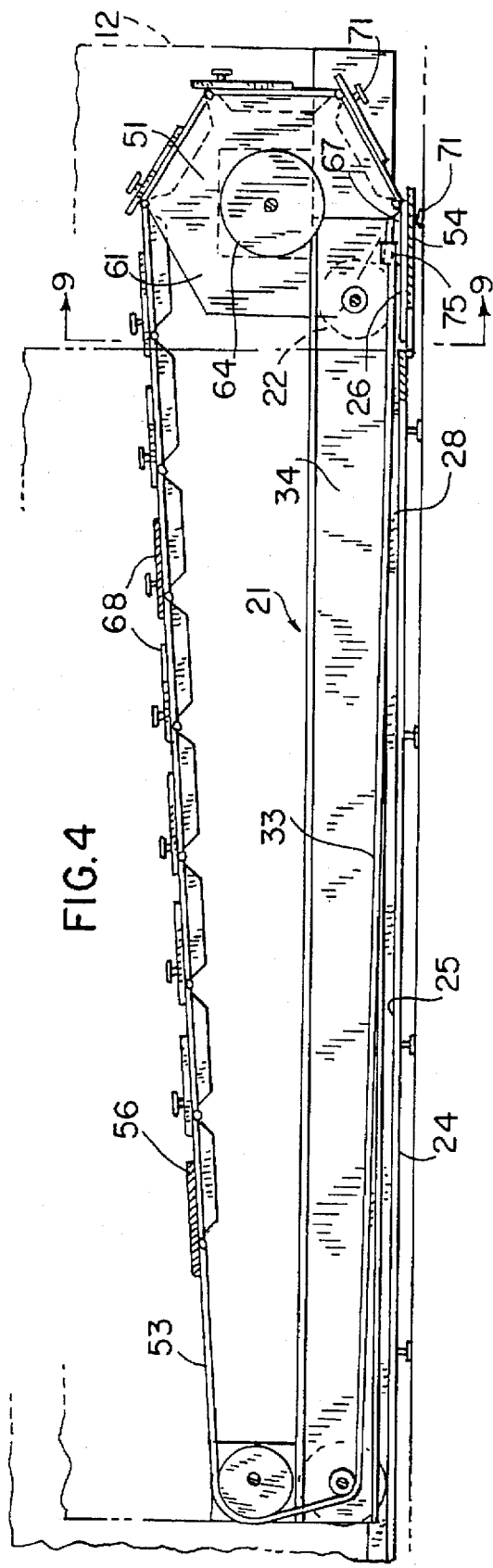

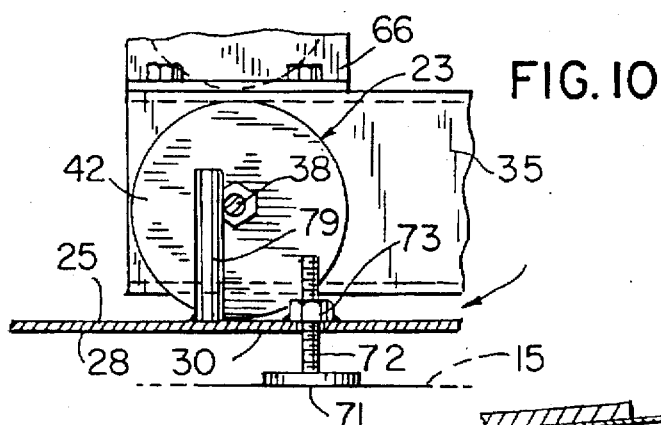
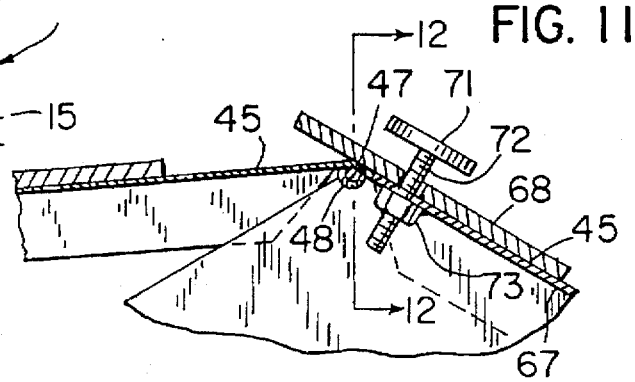
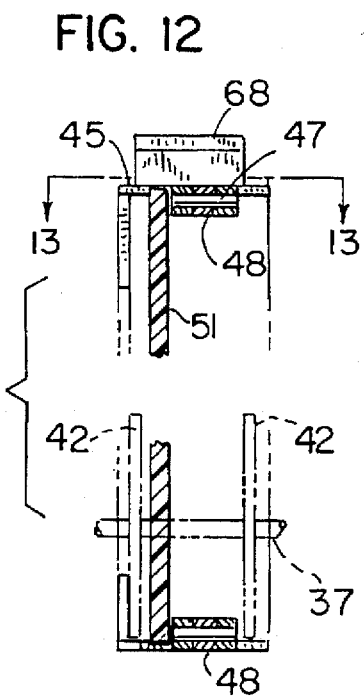
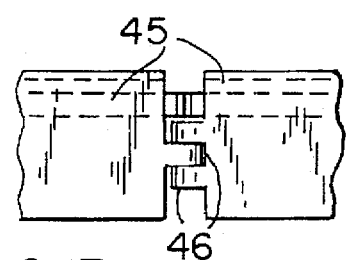
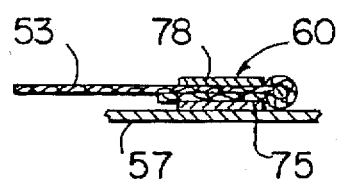
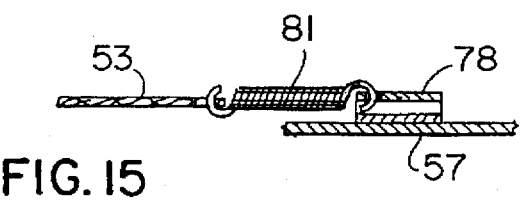

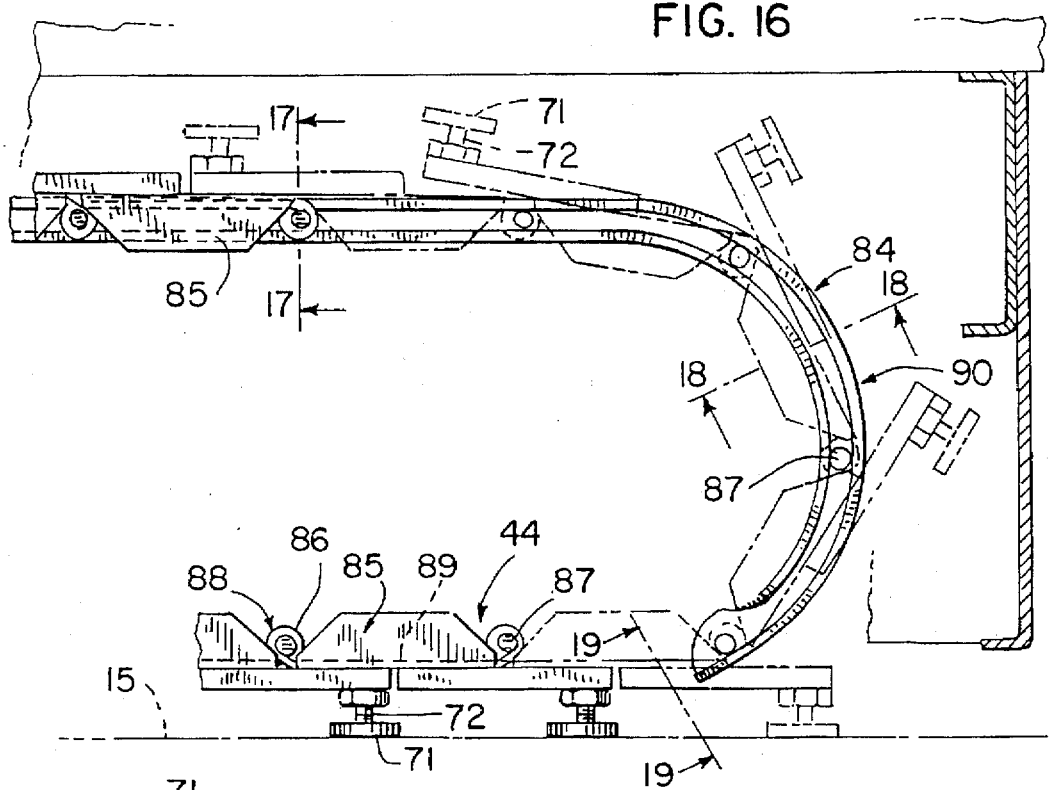
FIG. 16
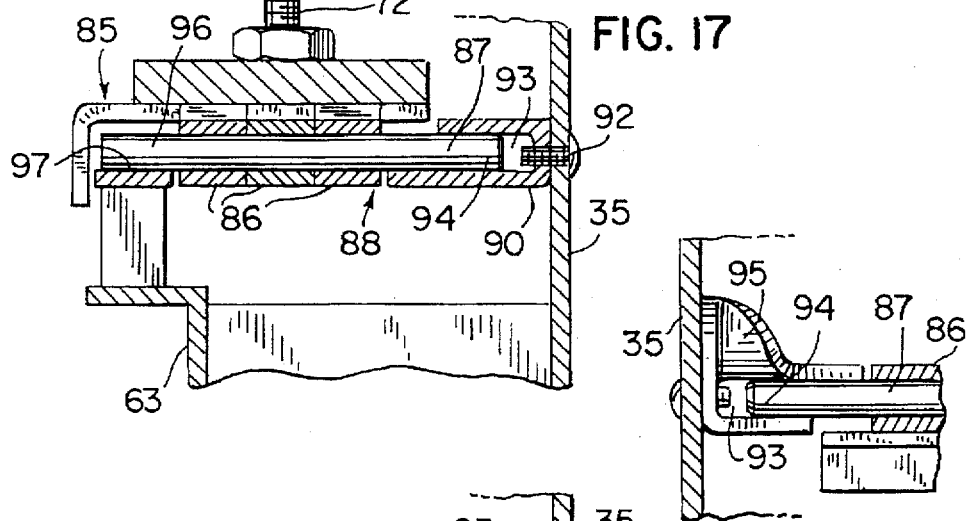
FIG. 17
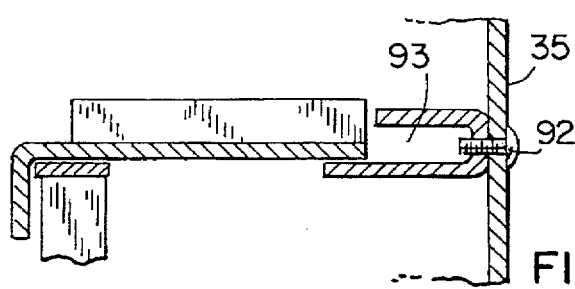
FIG. 18
FIG. 19

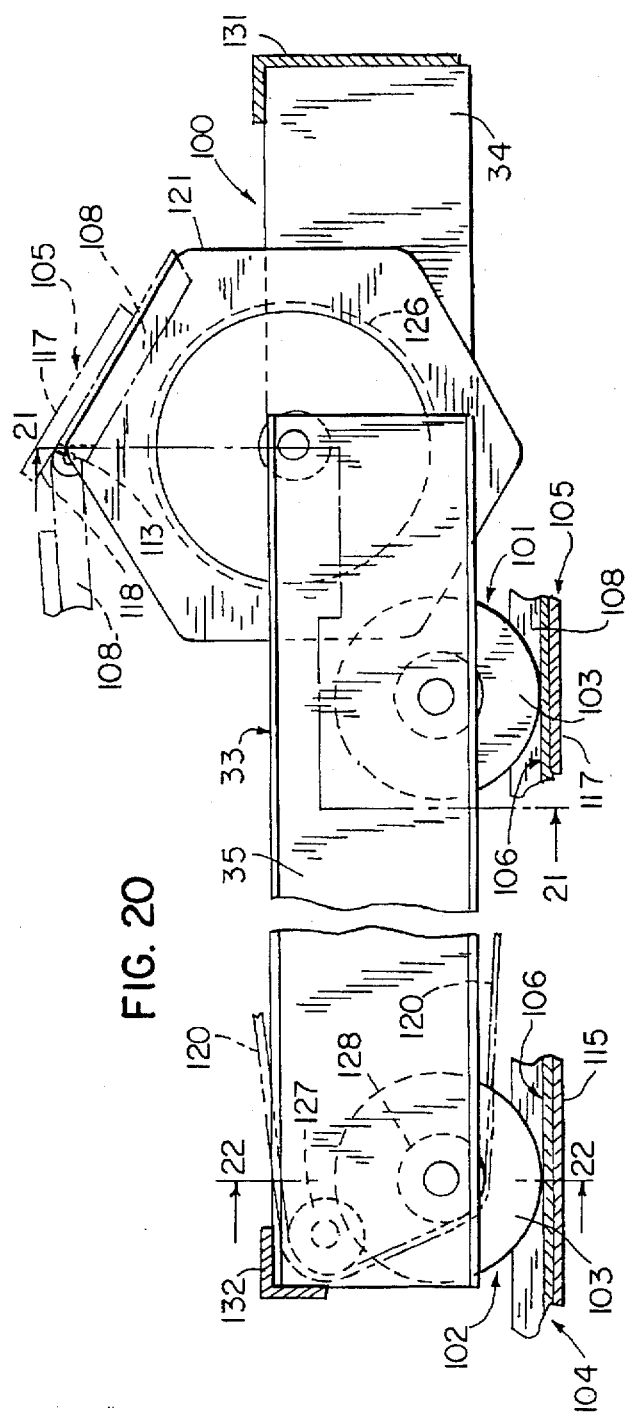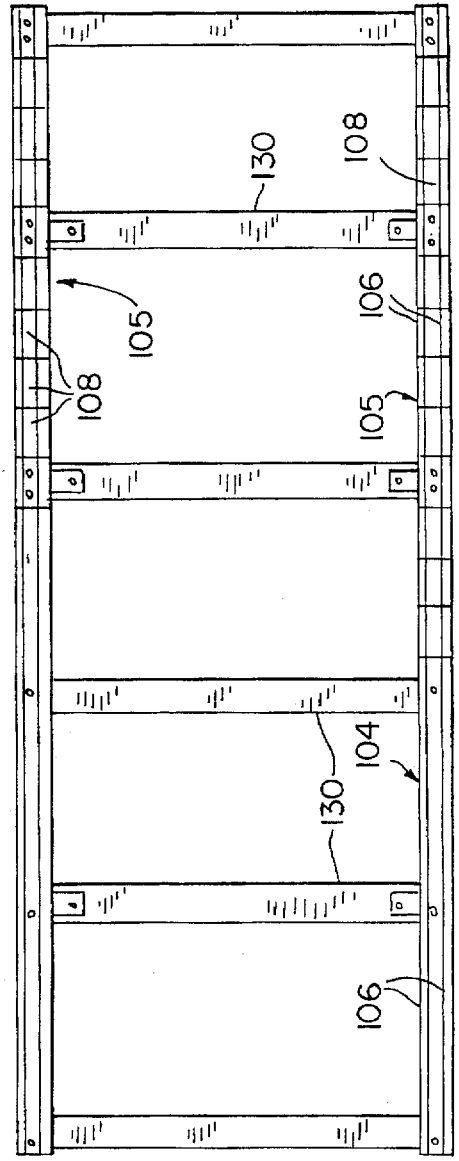

HIDDEN TRACK FILE STORAGE SYSTEM

BACKGROUND OF THE INVENTION

The present invention pertains to a storage system for supporting and moving individual storage units from a densely packed lateral array of units and, more particularly, to such a system in which a unit is moved longitudinally on its own track over which a wheeled supporting carriage travels between a stowed position and a longitudinally displaced access position.

Storage systems, such as are commonly used for the storage of business files on shelves, have been developed in which densely packed storage shelf units may be accessed for use by sliding individual units or groups of units laterally over a supporting track system to create a space between selected units for personnel entry to access a desired shelf or shelves. Such a compact lateral storage system is shown, for example, in U.S. Pat. No. 4,417,524. These systems require permanent track installations in the floor areas upon which personnel must walk to access the files. Furthermore, such systems inherently require personnel entry space which cannot be used for storage.

It is also known to provide shelf storage systems in which densely packed storage shelf units are each mounted on its own track, the tracks disposed parallel to one another, and individual shelf Storage units are rolled longitudinally past a unit positioned behind it to provide direct access via the space left by the shelf moved longitudinally. Such a slide-by system is shown, for example, in U.S. Pat. No. 5,205,627. These systems are also unable to utilize fully the potentially available storage space because of the inherent need to provide space for personnel access as well as space to which the slide-by unit is moved.

It is also known in the prior art to provide densely packed shelving or file storage units which may be individually rolled longitudinally from the storage position on a shelf supporting frame with front supporting wheels which roll over the floor. Stationary guides, which extend from the stowed position, guide the rear of the carriage in the manner of a conventional drawer. Such a system is shown in U.S. Pat. No. 4,123,126. This patent also discloses manually-powered drive means for the carriage support wheels to move the storage unit out and back in. Because the supporting carriage wheels roll directly over the base surface, the storage unit being accessed is directly affected by an uneven floor surface, carpet edges or other changes in the floor surface, and the like.

SUMMARY OF THE INVENTION

In accordance with the present invention, an apparatus is provided for supporting and moving individual storage units over a base surface from a densely packed lateral array of such units to a longitudinal access position in which the individual unit is horizontally displaced from the stowed position. The apparatus includes a carriage to support each storage unit for movement along a linear path between the stowed and access positions, each carriage having forward and rear support wheels. A support plate which overlies the base surface and provides a first planar support surface supports the carriage wheels in the stowed position. A flexible track provides support for the carriage in the access position, the track being anchored at one end to the forward end of the support plate. Means are provided for entraining and guiding the track for movement around the forward end of the carriage in a manner wherein the track is laid on the base surface in the path of carriage movement toward the access position, and the track is picked up from the path of carriage movement toward the stowed position. In the access position, the track defines a second planar support surface, which is contiguous with the first support surface, for the carriage support wheels.

Laterally adjacent storage units are interconnected with suitable lateral connectors joining the support plates. Preferably, the carriage support wheels comprise pairs of axially spaced forward and rear support wheels, and the support plate and the track comprise pairs of longitudinally aligned plate sections and flexible track segments, each of which defines a support surface section for one of each of the forward and rear support wheels. Wheel guides are provided on the track and are positioned to engage the lateral edges of the carriage support wheels to prevent deviation of the carriage from the linear path during movement. One or more holddown members are mounted on the support plate and/or the track to slidably engage the moving carriage. The holddown member which is mounted on the flexible track moves therewith to slidably engage the carriage in response to carriage movement toward the access position and track movement into the path of the carriage.

The apparatus of the present invention utilizes a flexible track connection which is entrained around the rear end of the carriage and operatively connects the other end of the track to the support plate. The flexible connection comprises a band which extends between a first connector at one band end which is connected to the other track end and a second connector at the other band end which is connected to the track adjacent the attachment of the track to the support plate.

In one embodiment, the track comprises a series of articulated links having contiguous support surface segments, which segments define the second planar support surface. The links include hinged joints, each joint comprising aligned cylindrical knuckles and a connecting pin. Manually adjustable base surface-engaging pads are provided on each link for adjusting the vertical position of the support surface segment above the base surface.

In a preferred embodiment, the track comprises a pair of laterally spaced interconnected track segment, each segment providing a support surface section for one of each pair of forward and rear support wheels. The flexible track connection preferably comprises a connector band for each track segment. The carriage includes a pair of parallel longitudinal frame members, each of which mounts a forward and rear support wheel, cross members interconnecting the track sections, and a holddown member mounted on one of the cross members and positioned to engage the longitudinal frame members in response to carriage movement toward the access position. The carriage further includes cross frame members which interconnect the longitudinal frame members and establish an axial support wheel spacing which corresponds to the lateral spacing of the track sections.

The support plate may comprise an extension of the track and be similarly constructed. Preferably, the support plate comprises a plate section for each track section and, in this embodiment, the plate sections are preferably track section extensions.

BRIEF DESCRIPTION OF THE DRAWINGS

FIG. 3 is a lateral side elevation of the apparatus of the present invention in the fully stowed position.

FIG. 4 is an elevation view similar to FIG. 3 showing initial longitudinal movement of the carriage and track system toward the access position.

FIG. 10 is an enlarged section taken on line 10—10 of FIG. 8 showing the rear carriage stop and leveling adjustment for the support plate.

FIG. 11 is a detailed sectional view showing articulation of the hinged track on the track guide, taken on line 11—11 of FIG. 9.

FIG. 12 is a vertical sectional detail taken on line 12—12 of FIG. 11.

FIG. 13 is a horizontal sectional detail taken on line 13—13 of FIG. 12.

FIG. 14 is a detail of the flexible connection for the track taken on line 14—14 of FIG. 9.

FIG. 15 is a detail of an alternate embodiment of FIG. 14.

FIG. 16 is an enlarged lateral side elevation of the forward end of an alternate embodiment of the carriage and track guide of the present invention.

FIG. 17 is a sectional detail taken on line 17—17 of FIG. 16.

FIG. 18 is a sectional detail taken on line 18—18 of FIG. 16.

FIG. 19 is a sectional detail taken on line 19—19 of FIG. 16.

FIG. 20 is a vertical section, taken longitudinally, through the carriage and supporting track showing portions of another embodiment of the invention.

FIG. 23 is a top plan view of the fixed and flexible carriage-supporting tracks of FIG. 20.

DETAILED DESCRIPTION OF THE PREFERRED EMBODIMENTS

Figure 1:
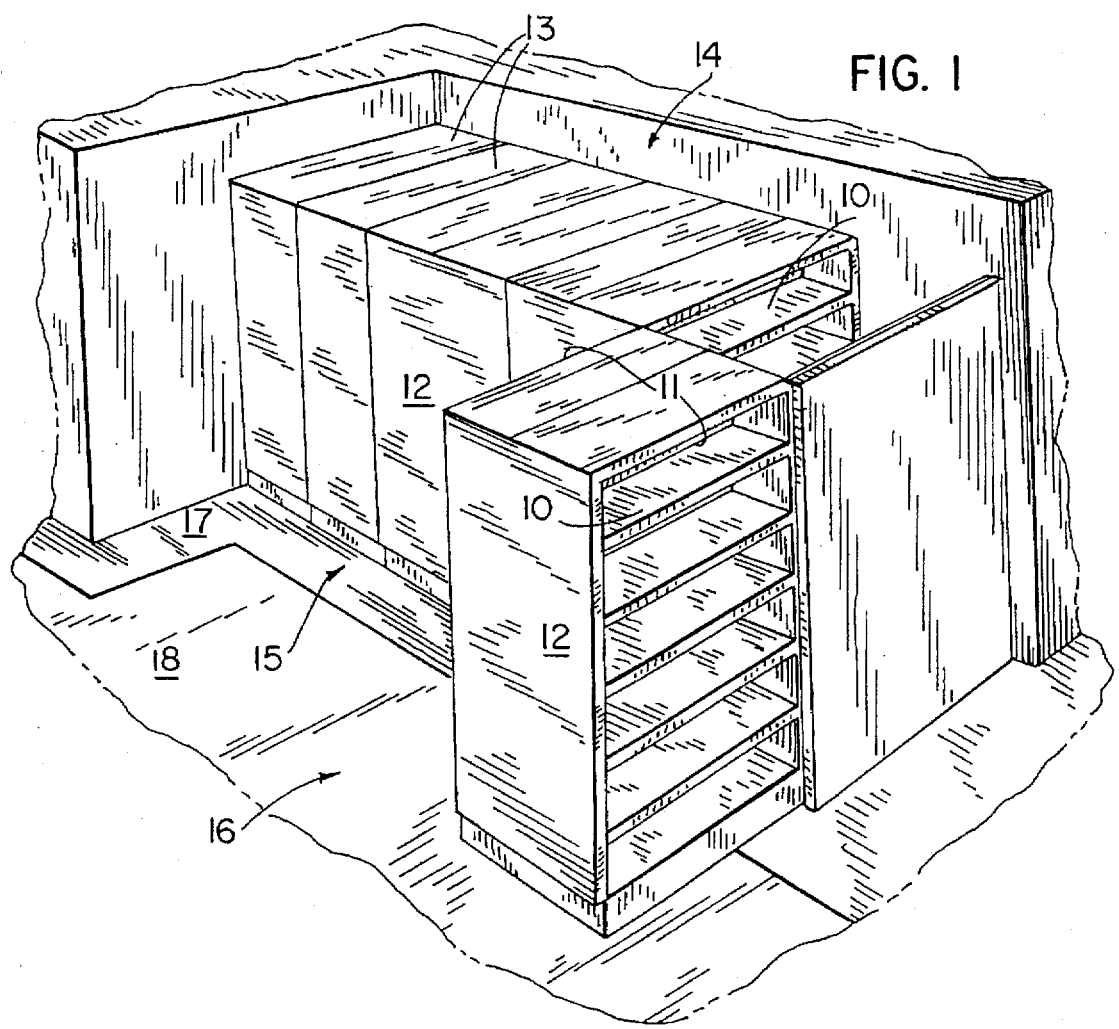
FIG. 1 is a perspective view showing a schematic representation of the file storage system of the present invention.
Figure 2:
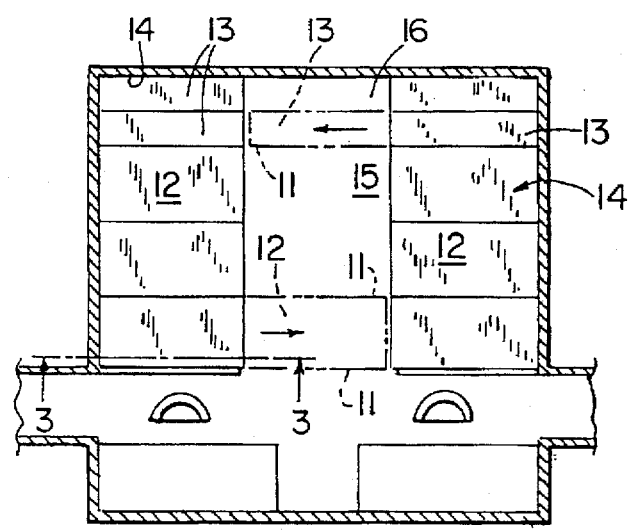
FIG. 2 is a schematic top plan view of the system shown in FIG. 1.

Referring initially to FIGS. 1 and 2, the apparatus of the present invention is particularly adapted for use in a file storage system of the type in which parallel rows of back-to-back shelves 10 have oppositely opening faces 11 providing open access for the storage of files. The shelves 10 may also be conveniently utilized to store books, as well as a wide variety of other products. The apparatus of the present invention is adaptable particularly to handling a two-shelf unit 12, but may also be adapted to support and move a single unit 13.

An important feature of the present invention is the ability to stow all of the storage units in a manner which completely fills a rectangular storage area, thus requiring no unused storage space, except for the usual aisles required for access by the personnel utilizing the storage system. This densely packed array eliminates the need to provide additional lateral space required in so-called lateral file systems or slide-by file systems. As shown in the drawings, therefore, when the shelves 12 and/or 13 (or other generally prismatic storage units) are in their fully stowed positions, the entire rectangular storage area 14 is fully occupied. The storage units are moved longitudinally over a floor or other base surface 15 into an aisle 16 where either of the opposite faces 11 may be conveniently accessed. The system is also uniquely adapted to move longitudinally between its stowed and access positions over an uneven floor surface which may, for example, require storage unit movement from a concrete floor 17 onto a raised carpeted surface 18. Storage units which are positioned against a fully extending rear wall, such as single units 13, must be capable of being accessed by moving only a single unit, because of the inability to access one face 11 of a unit positioned against the rear wall.

Finally, another important aspect of the present invention is the ability to install an entire storage system, utilizing the supporting and moving apparatus to be described, without the need to attach or anchor any part of the system to the floor or walls. This also permits the use of a unique leveling arrangement which allows utilization of the system on an inherently rough, uneven, or sloping floor without the need to specially finish the floor to make it level.

Figure 5:
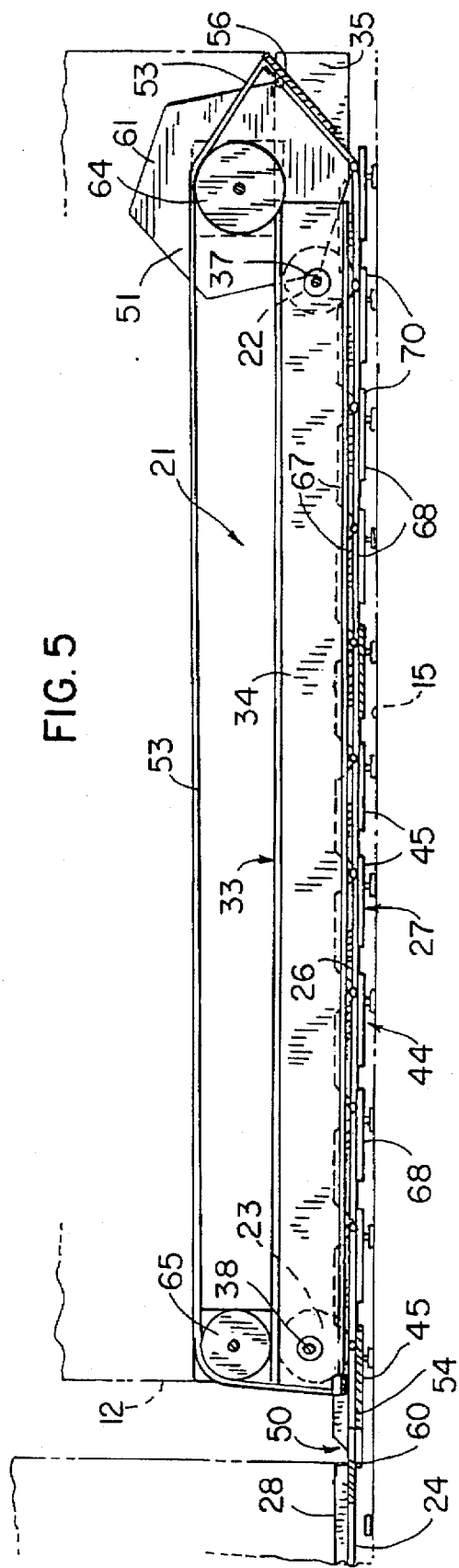
FIG. 5 is a view similar to FIGS. 2 and 3 showing the unit moved to the full access position.

FIGS. 3-5 show, in vertical side elevation, the general manner of operation of the apparatus of the present invention to move a conventional steel frame shelf unit 12 (or 13) from its stowed position (FIG. 3) against a rear wall 20 in a longitudinal direction to a full access position (FIG. 5) where the unit has fully cleared any lateral enclosing wall or adjacent storage unit. The storage unit 12 is supported on a carriage 21 which includes pairs of axially spaced forward and rear support wheels 22 and 23, respectively. The carriage 21 is adapted to roll on its support wheels 22 and 23 over a flat contiguous surface which includes a support plate 24 overlying the base surface 15 and providing a first planar support surface 25, onto and over a second planar support surface 26 which is provided by a flexible track 27 supported for movement around the forward end of the carriage and laid on the base surface in the path of carriage movement between the stowed and access positions of FIGS. 3 and 5, respectively.

Referring also to FIGS. 6-9, the support plate 24 preferably comprises a pair of parallel laterally spaced angle members 28, each having a horizontal leg 30, the upper surface of which defines the first planar support surface 25, and a vertical leg 31 which provides a lateral guide for the carriage wheels 22 and 23. The angle members 28 are interconnected by cross pieces 32 conveniently spaced longitudinally along the length of the carriage 21.

The carriage includes a pair of longitudinal frame members 33, each of which comprises an interconnected outer channel 34 and inner channel 35. The cross frame members 36 which interconnect the longitudinal frame members 33, including the channel members 34 and 35, may conveniently comprise forward and rear shafts 37 and 38, respectively. The shafts also provide rotatable support for the carriage wheels 22 and 23.

Figure 8:
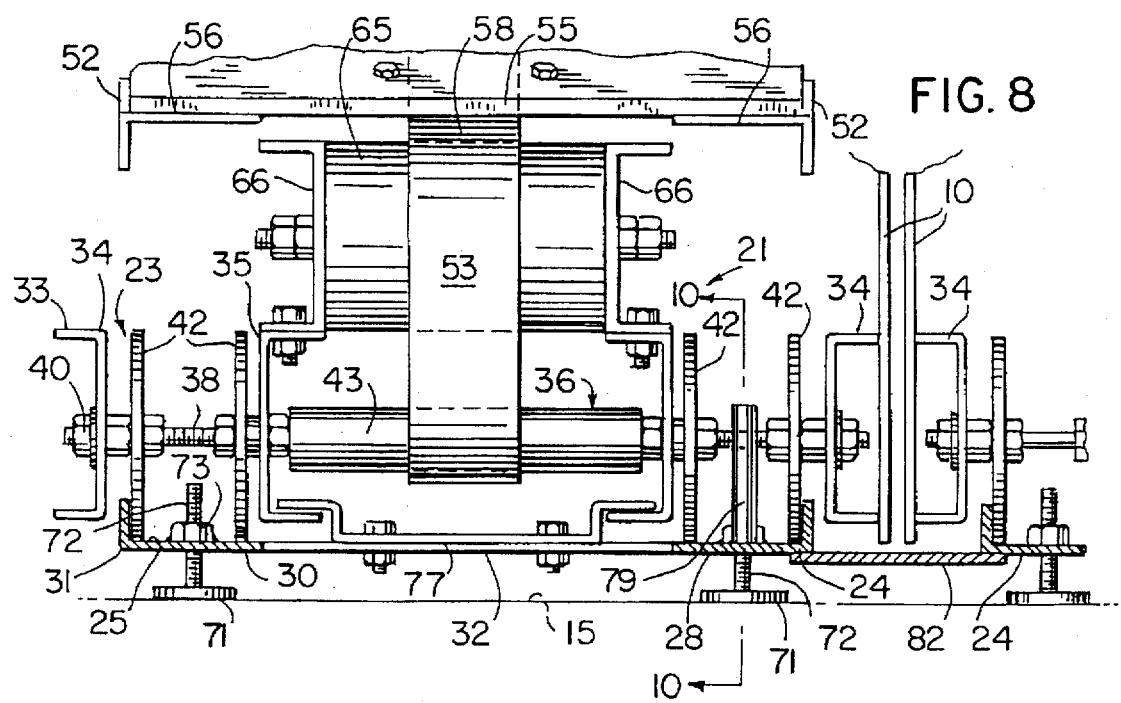
FIG. 8 is a partial vertical sectional view of the apparatus of the present invention.
Figure 9:
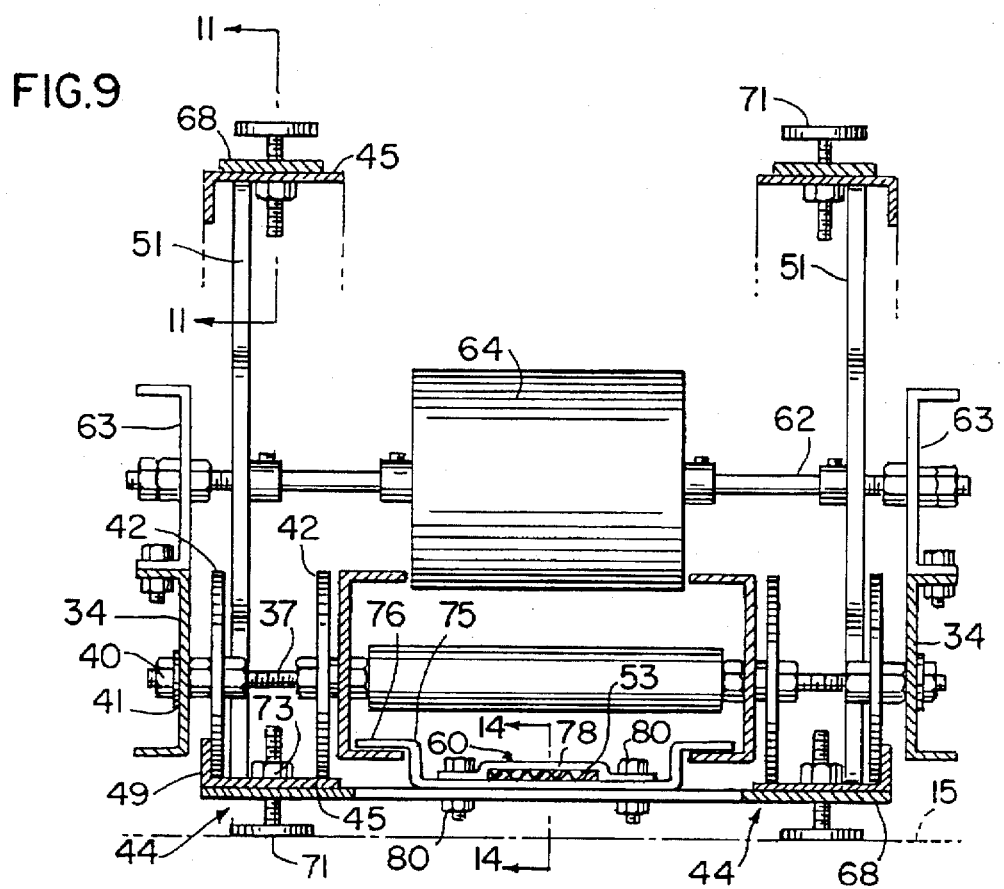
FIG. 9 is a vertical sectional view of the apparatus of the present invention taken on line 9—9 of FIG. 4.

As may best be seen in FIGS. 8 and 9, the shafts 37 and 38 which provide support for the forward and rear wheels 22 and 23, respectively, as well as interconnection of the frame members 33, extend laterally between the outer channels 34 nearly the full width of the carriage 21. Each of the shafts 37 and 38 is threaded along a substantial portion of each opposite end to receive thereon suitable spacing and locking nuts 40 and washers 41. Each forward wheel 22 and rear wheel 23, in the embodiment shown, comprises a pair of axially spaced wheel segments 42. Each wheel segment may include a central hub with a suitable anti-friction bearing (not shown) for rotatable support on its respective shaft 37 or 38. Each of the shafts thus interconnects a pair of outer channels 34, a pair of wheel segments 42, a pair of inner channels 35, the latter being suitably spaced by a center spacer roll 43. Additional rigidity is provided for the frame of the carriage 21 by assemblies of elements which carry and guide the flexible track 27, as will be described hereinafter, and by frame elements of the shelf unit 12 mounted on and carried by the carriage.

The flexible track 27 which supports the carriage as it rolls to and from the access position (FIG. 5) comprises a pair of laterally spaced and laterally interconnected track segments 44. Each track segment is comprised of a series of articulated links 45 having hinged joints 48, each comprising interfitting knuckles 46 connected by a connecting pin 47. The links 45 are preferably L-shaped in vertical cross section, as seen in FIGS. 9 and 12 with the vertical leg 49 of the link providing the same guiding function for the carriage wheels 22 and 23 as the vertical legs 31 of the supporting angle members 28. Each track segment 44 is preferably just slightly longer than the length of the carriage 21. Each track segment 44 is connected at one end 50 to the forward end of a support plate angle member 28 with a pinned connection to the last track link 45. Each of the track segments 44 is entrained around a guide wheel 51 mounted on the forward end of the carriage 21 and the other ends 52 of the track segments are laterally interconnected by a forward link cross connector 55 between the forward end links 56.

The anchored ends 50 of the track segments 44 are also laterally connected by a rear link cross connector 57 extending between the rear end links 54. A flexible connector band 53 is attached at its opposite ends for entrainment around the rear end of the carriage 21 between a forward connection 58 to the forward link cross connector 55 and a rear connection 60 to the rear link cross connector 57. Thus, as may be seen in FIG. 3 or FIG. 5, each track segment 44 and connector band 53 forms a continuous element allowing the track segments to be laid down in front of the advancing carriage to provide the second planar support surface 26 for the carriage wheels as the carriage moves from the FIG. 3 stowed position to the FIG. 5 access position.

Each track segment guide wheel 51 may have a polygon shaped outer rim with each rim segment 61 having a length approximately equal to the track link pitch. The guide wheels 51 are rotatably mounted on a guide wheel shaft 62 which extends laterally between a pair of forward connector brackets 63. The connector brackets are, in turn, attached to the outer channels 34 of the carriage frame, as is best seen in FIG. 9. A forward band roller 64 is mounted coaxially with the guide wheels 51 and centered therebetween. The forward roller 64 provides rolling support for the connector band 53 as the flexible track 27 reaches its fully extended access position as shown in FIG. 5. Referring to FIG. 8, a rear band roller 65 is rotatably mounted between a pair of rear connector brackets 66 which, in turn, are connected to the inner channels 35. The rear band roller 65 provides support for the connector band 53 which is entrained around the roller over nearly its full length as the carriage moves between the two extreme positions. The connector band 53 also passes over the spacer roll 43, which is positioned directly beneath the rear band roller 65 as shown, except in the fully extended position shown in FIGS. 5–7.

As the carriage is rolled forwardly on its wheels 22 and 23 over the first support surface 25 provided by the angle members 28, the links 45 of the track segments 44 will be laid horizontally in front of the advancing carriage in the manner of a crawler-type track laying vehicle. The inner or backside surfaces 67 of the links 45 define the second planar support surface 26 for the carriage wheels 22 and 23. The links and their connecting hinged joints 48 are constructed such that the adjacent edges of interconnected links are closely spaced to provide a contiguous support surface 26 over which the carriage wheels roll smoothly. Each track link 45 includes a base plate 68 attached to the outer link surface and extending over the hinged joint 48 to overlie a portion of the outer surface of the next link. In the generally horizontal position of the track in the FIG. 5 access position, the base plate extensions 70, which underlie a portion of the surface of the next link, actually engage that portion of the outer surface to provide link-to-link load support.

Each base plate 68 is provided with a height adjustment pad 71 which includes a stud 72 threaded into an adjusting nut 73 fixed to the inner surface 67 of the link. The assembly may also include a locking nut (not shown) threaded onto the stud above the pad and below the base plate 68, all in a manner well known in the art. Similarly, each of the angle members 28 is provided along its length with identical adjustment pads 71 extending through the horizontal legs 30 and into threaded engagement with an adjusting nut 73 secured to the upper surface of the horizontal leg. In this manner, each of the support plate members 28 and each of the track segments 44 can be adjusted along its length to accommodate variations in the level of the base surface 15 so that the surfaces over which the carriage rolls may always be maintained coplanar.

Referring once again to the sequence of positions shown in FIGS. 3–5, with the carriage 21 in the fully retracted stowed position, all links 45 of the track segments are out of contact with the base surface and the end links 54 are angled upwardly in contact with a flat outer edge of the guide wheel 51. The forward end links 56 of the track segments are disposed just forwardly of the rear band roller 65. From the forward connection 58 of the connector band to the rear link cross connector 57, the connector band extends around the rear band roller 65, spacer roll 43, forwardly around the forward spacer roll 74 to its rear connection 60 with the rear link cross connector 57. As the rearward end links 54 are laid onto the base surface 15, in response to forward movement of the carriage and relative movement of the track segments around the guide wheels 51, the adjustment pads 71 support the links in a horizontal position (as shown in FIG. 4) with the inner surfaces 67 of the links then lying coplanar with the wheel support surfaces of the plate members 28. This allows the forward wheels 22 of the carriage to roll smoothly onto the track segments which continue to be laid in laterally adjacent pairs in the path of the forwardly moving wheels.

Because of the geometry of the continuous connection provided by the track and connecting band, the carriage, in effect, overruns the track and moves toward the full access position at a rate twice the rate of horizontal movement of the track. Eventually, the laterally adjacent pair of forward end links 56 pass around their respective guide wheels 51 as the corresponding end of the connector band 53 rides over the forward end band roller 64 (FIG. 5). Simultaneously, the rear wheels 23 of the carriage roll from the support surface 26 of the angle members 28 onto the rear end links 54 of the track segments 44. At this point, the rear end of the carriage and the attached storage unit 12 has cleared the forward end of the laterally adjacent storage units (which, of course, are still in their stowed positions).

Figure 7:
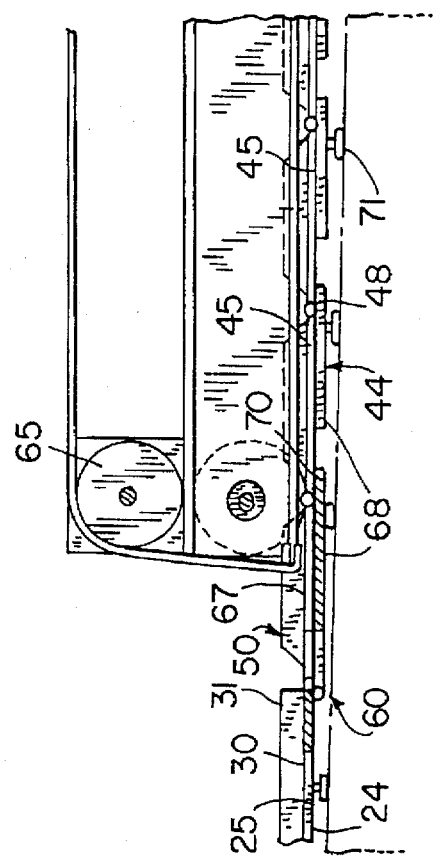
FIGS. 6 and 7 are enlarged partial side elevation views showing the leveling feature of the present invention.
Figure 6:
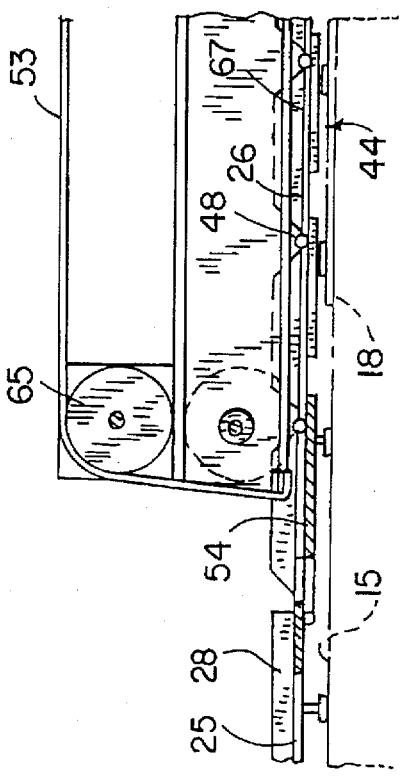

The endless connection of the track segments, provided by the fixed connection to the track members 28 and to the connector band 53, causes a precise reversal of track movement when the carriage is pushed in the reverse direction back into its stowed position. It is important to note that the adjustment pads 71 on each of the track segments 44 are laid in the same positions on the base surface 15 whenever the carriage and storage unit are moved to the access position. In this manner, the adjustment pads 71 need only be initially set to accommodate variations in the base surface and, thereafter, need not be readjusted. Furthermore, the adjustment pads may be utilized to accommodate movement of the carriage from a lower base surface to a raised surface, such as a carpet 18, as shown in FIG. 6. Also, as shown in FIG. 7, selective vertical positioning of the adjustment pads 71 can be utilized to maintain a perfectly horizontal track for the carriage over a sloping base surface.

To provide stability against lateral tipping, particularly when the carriage and attached storage unit 12 are moved to the full access position, the rear track link cross connector 57, as well as similar cross connectors spaced along the length of the track (but not shown), are each provided with a holddown bracket 75 which moves into engaging relationship with the lower flanges of the inner channels 35 as the track is laid in front of the advancing carriage. The holddown bracket 75 is shown in the sectional view of FIG. 9 and the manner in which it functions may be seen in the sequence of FIGS. 3 and 4. In FIG. 3, the holddown bracket 75 is shown attached to the rear link cross connection 57 and, in FIG. 4, the holddown bracket has been laid into the path of the advancing carriage such that the upper flanges 76 on opposite lateral ends of the bracket are slidingly engaged by the lower flanges of the channels 35 as the carriage moves forwardly. As indicated, similar holddown brackets may be attached between the track segments 44 along the lengths thereof. As shown in FIG. 8 and at the rear end of the FIG. 3 view, a similar fixed position holddown bracket 77 may be attached to the cross piece 32 interconnecting the angle members 28. Similar fixed position holddown brackets may be attached to other cross pieces extending forwardly along the length of the angle members 28.

As is also best seen in FIGS. 8 and 9 and in the sectional view of FIG. 12 as well, by using laterally spaced wheel segments 42 for all of the forward and rear wheels 22 and 23 of the carriage, the wheel segments readily straddle the hinged joints 48 of the track and the studs 72 and adjusting nuts 73 of the adjustment pads 71. Referring also to FIG. 10, a vertical stop pin 79 extends vertically upward from the horizontal leg 30 of the fixed track section 28 to engage the rear axle shaft 38 and prevent carriage overrun in movement back to the stowed position.

The connector band 53 is preferably made of a strong, flexible, but inextensible strap, such as a woven nylon cargo strap or the like. Because the connector strap tracks along a slightly different path than the flexible track 27, the positioning of the spacer rolls 43 and 74 and band rollers 64 and 65 must be carefully chosen in order to maintain the continuous track connections in fairly uniform tension. The presently preferred connections 58 and 60 for the band ends to the forward and rear link cross connectors 55 and 57, respectively, is shown by way of example in FIG. 9 and the sectional view of FIG. 14. Thus, the rear connection 60 utilizes a clamping plate 78 to clamp the end of the band 53 to the upper surface of the holddown bracket 75. Conveniently, the same connecting bolts 80 may simultaneously connect the clamping plate to the holddown bracket and the latter to the rear link cross connector 57. In order to accommodate possible variations in the respective travel paths of the connector band and the flexible track, the band may be connected to the clamping plate 78 with an extensible connection, such as the coil spring 81 shown in FIG. 15. Similarly, the entire connector band may be made of an inherently extensible material, such as a rubber band or a bungee cord.

As indicated previously, the apparatus of the present invention is not anchored to the base surface 15. However, the support plates 24 of adjacent units are preferably interconnected by providing tie bars 82 between the angle members 28 of adjacent storage units, as shown in FIG. 8. The tie bars are preferably spaced longitudinally along the lengths of the interconnected angle members of adjacent units and are preferably rigid because adjacent storage units always remain aligned with any vertical positioning needed to accommodate an uneven base surface being accomplished by adjustment pad positioning. Suitable demountable connectors (not shown) are preferably utilized to accommodate assembly and disassembly of the tie bars.

FIGS. 16–19 show a track guide arrangement of an alternate embodiment showing means for guiding the flexible track segments 44 in lieu of the guide wheels 51 of the preferred embodiment. The modified track links 85 of this embodiment are, in all respects, virtually the same as the links 45 of the previously described embodiment, except for the use of extended length connecting pins 87. Thus, the modified links 85 include interfitting knuckles 86 which, with the connecting pins, provide hinged joints 88. To guide the modified track segments 84 around the forward end of the carriage (which is not shown in FIGS. 16–19), an arcuate guide chute 90 is provided for each modified track segment 84. The guide chute 90 may be attached to the forward end of the carriage 21, as with threaded attachments 92 connecting the guide chute directly to the outside face of the inner channel 35 or suitable vertical extensions thereof. The guide chute defines an arcuate or semicircular slot 93 in which one extended end 94 of each connecting pin 87 slides to guide the track in either direction. The lower end of the pin slot 93 includes a converging lead-in surface 95 to help guide the pin ends into the slot as the track links are picked up from the surface in response to movement of the carriage back to its stowed position. The other extended pin ends 96 may be supported on a semicircular arcuate surface 97 attached to the forward end of the outer channel 34 or forward connector bracket 63. It should be noted that, in this embodiment, provision must be made to prevent interfering contact between the carriage wheels (22 or 23 in the preceding drawings, but not shown in FIGS. 16–19) and the extended pin ends 94 and 96. As the carriage wheels roll over the wheel support surfaces 89 of the track links 85, the rims of the wheels will engage the extended pin ends unless appropriate clearance is provided. One manner of providing such clearance would be to provide arcuate notches in the peripheries of the carriage wheels, large enough to receive the extended pin ends therein, and to make the carriage wheel pitch diameter correspond to the track link pitch (or some multiple thereof).

In another and presently preferred embodiment, both the stationary track members and the flexible track segments are provided by die-formed elements having identical and more rigid box-like cross sections. In this embodiment, the track segment guide wheels are also modified to accommodate a separate connector band for each track segment. Thus, referring to FIGS. 20–25, a modified carriage 100 includes the same basic longitudinal frame members 33 as in the previously described embodiments. Thus, the carriage frame includes laterally spaced pairs of parallel outer channels 34 and inner channels 35. Each lateral side of the carriage includes an interconnected outer channel and inner channel, between which are mounted the forward wheels 101 and rear wheels 102. Each of the wheels, in turn, comprises a pair of laterally spaced wheel segments 103. The forward and rear wheels on each side of the carriage are supported and run along a fixed track section 104, generally defining the stowed position of the storage unit, and an attached flexible track segment 105 which is laid on the base surface in the path of carriage movement and supports the carriage in the extended access position. In this regard, the carriage and supporting fixed track sections 104 and flexible track segments 105 are functionally the same as in the previously described embodiments.

Figure 21:
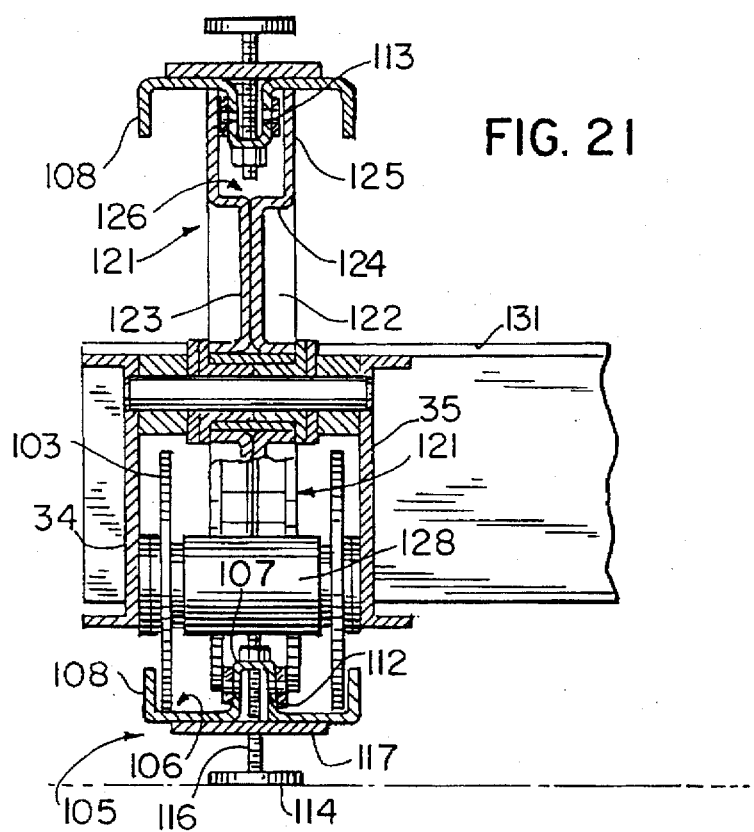
FIG. 21 is a generally vertical section taken on line 21—21 of FIG. 20.
Figure 22:
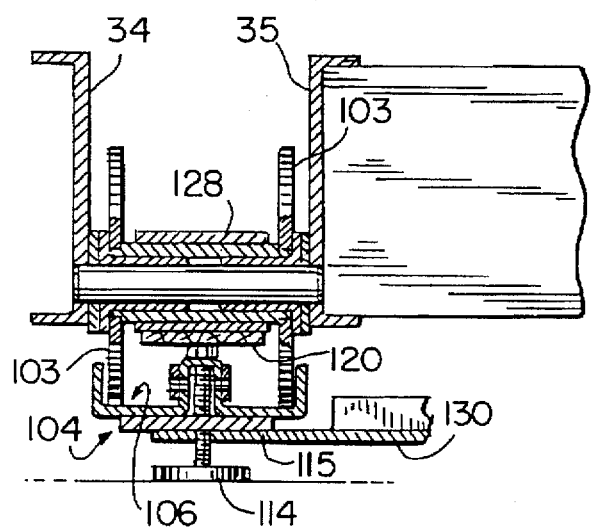
FIG. 22 is a vertical section taken on line 22—22 of FIG. 20.
Figure 24:
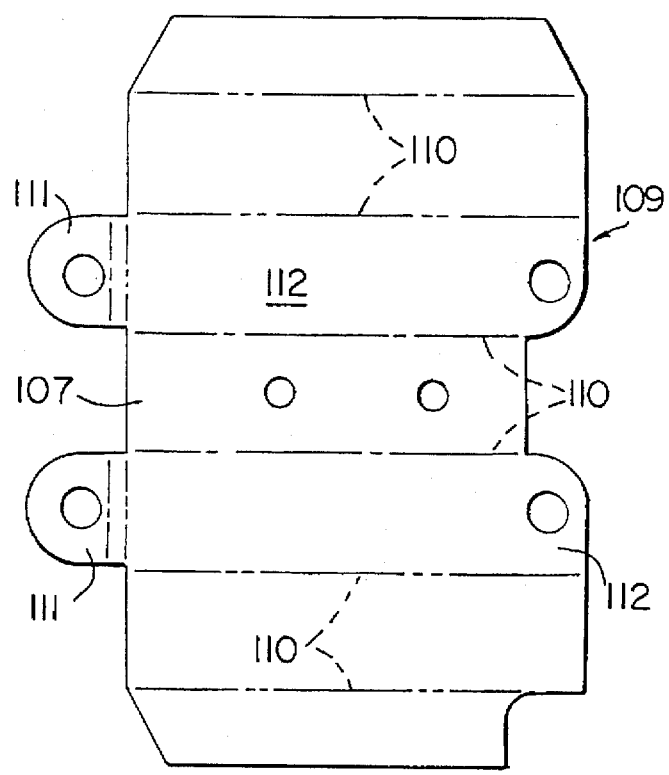
FIG. 24 is a plan view of a sheet metal stamping from which each of the flexible track links is subsequently die formed.
Figure 25:
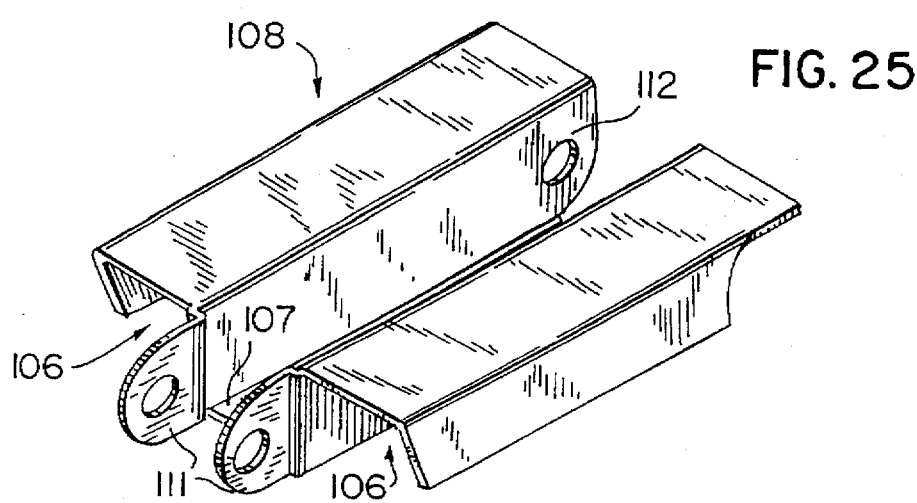
FIG. 25 is a perspective view of a link formed from the FIG. 24 stamping.

Referring particularly to FIGS. 21 and 22, the vertical lateral cross sections of the fixed track section 104 (FIG. 22) and flexible track segment 105 (FIG. 21) are virtually identical. Both of these components are preferably die formed from relatively light steel strip, for example 12 gauge, but the box-shaped cross section imparts good rigidity and bending strength to these elements. The cross section is defined by two generally U-shaped channels 106 interconnected by a central upper web 107. As seen in FIG. 23, each of the fixed track sections 104 is constructed of a single piece. Each flexible track segment 105, on the other hand, is made of a series of interconnected links 108, each formed of an individual stamping, but to generally the same cross section as the fixed track sections 104. FIG. 24 shows one form of a planar stamping 109 from which the links may be die formed, to the desired cross section on the bend lines 110. Referring also to FIG. 25, each of the links 108 formed from a stamping 109 includes a pair of apertured ears 111 extending from one edge. The ears 111 are offset in the forming process so that, in the final formed link 108, the ears will overlap and the apertures therein align with holes in the opposite ends of the inner walls 112 for receipt of a link connecting pin 113.

The fixed track sections 104 are provided with adjustment pads positioned in spaced relation along the length thereof. Preferably, an elongate stiffening base plate 115 is attached to the bottom of and runs the length of each fixed track section 104. The base plate is interposed between the adjustment pad and the track section itself and, most preferably, the adjusting stud 116 for the pad 114 is threadably attached to the base plate.

As indicated, and referring also to FIG. 21, each of the flexible track segments 105 of this embodiment, when laid upon the base surface in response to forward movement of the carriage 100, provides a horizontal surface substantially continuous with the respective fixed track section 104 for the carriage wheels 101 and 102. As with the U-shaped channels 106 in the fixed track section, the wheel segments 103 of each wheel 101 or 102 are caused to track within the same U-shaped channels as the carriage rolls over it. Each track link 108 includes a separate base plate 117 attached by bolted connections to the upper web 107 of the link 108. Each base plate includes a surface extension 118 which overlies and makes supporting contact with a part of the surface of the adjacent interconnected link 108 (in generally the same manner previously described with respect to the other embodiments).

Instead of utilizing a single connector band 53, as in the above described embodiments, in this embodiment a separate connector band 120 is provided for each flexible track segment 105. The band interconnects the opposite ends of each track segment, in generally the same manner previously described, and each track segment 105 is also attached to the forward end of its respective fixed track section 104. A modified guide wheel 121 is pivotally mounted between and at the forward end of each pair of channels 34 and 35. Each guide wheel is formed of back-to-back wheel halves 122 which may be stamped and formed of sheet metal and connected, as by spot welding, along their abutting central webs 123. The central webs form, at their peripheries, a dished surface 124 and integral end flange 125, which together form a peripheral slot 126 which is deep enough to accommodate the raised central portion of the links 108 including any stud or bolt ends and connecting nuts for the various parts attached thereto. The peripheral slot 126 also acts as a pulley for receipt of the connector band 120 which travels thereover as the carriage reaches its outermost access position and the flexible track segments have been nearly fully laid on the base surface. Each connector band 120 extends rearwardly from its connection to the track segment, over an upper guide pulley 127 at the rear of the carriage and downwardly and around a bushing 128 journaled on a hub between the wheel segments 103 of the rear wheel 102. From there, the connector band extends forwardly to an appropriate attachment to the other end of the flexible track segment 105, all in a manner previously described with respect to the other embodiments.

Both the pairs of parallel fixed track sections 104 and the linearly attached flexible track segments 105 are laterally interconnected and maintained in parallel spaced relation by similar channel members 130 spaced along the lengths of each respective pair and attached by opposite ends thereto. Thus, referring also to FIG. 23, the channel members 130 may be secured to the undersides of the fixed track section base plates 115, and to the undersides of the flexible track segment base plates 117, in both instances utilizing the same mounting bolts and nuts used for the base plates 115,117 themselves. As shown in FIG. 20, the opposite pairs of carriage channels 35 are interconnected at the forward end with a forward angle member 131 interconnecting the ends of the two inner channels 35. At the rear of the carriage, a rear angle member 132 interconnects the ends of both pairs of outer and inner channels 34 and 35.

In any of the foregoing embodiments, the fixed track members (either the angle section track members 28 or the fixed track sections 104) may be eliminated and replaced by simply extending the respective flexible track segments 44 or 105 over the full lengths of the replaced fixed track sections. Full functionality of the system is otherwise retained and, although the use of full length flexible track segments to support the carriage in the stowed as well as the access position would likely be somewhat more costly, the total number of different parts used in the system would be reduced.

I claim:

1. An apparatus for supporting and moving a generally prismatic storage unit over a base surface from a stowed position to a horizontally displaced access position, said apparatus comprising:

a carriage adapted to support a storage unit for movement along a linear path between the stowed and access positions, said carriage including pairs of axially spaced forward and rear support wheels;

a support plate overlying the base surface and providing a first planar support surface for said carriage support wheels in the stowed position;

a flexible track providing support for said carriage in the access position;

said track having one end attached to a forward end of said support plate, said track entrained around a forward end of said carriage in the stowed position;

a track guide on the forward end of the carriage supporting the track for movement around said forward end to lay the track on the base surface in the path of carriage movement toward the access position and to pick up the track from the path of carriage movement toward the stowed position; and, said track providing a second planar support surface for said carriage support wheels in the access position, said first and second support surfaces being coplanar.

2. The apparatus as set forth in claim 1 including a flexible connection entrained around a rear end of said carriage and operatively connecting the other end of said track to said support plate.

3. The apparatus as set forth in claim 2 comprising:

a pair of parallel laterally spaced track segments, each providing a support surface for one of each pair of forward and rear support wheels; and, a flexible connector band for each track segment.

4. The apparatus as set forth in claim 2 wherein said flexible connection comprises a band extending between a first connector at one band end connected to said other track end and a second connector at the other band end connected to said track adjacent the connection of said track to said support plate.

5. The apparatus as set forth in claim 1 wherein said track comprises a series of articulated links having contiguous support surface segments, said segments defining the second planar support surface.

6. The apparatus as set forth in claim 5 wherein said links comprise formed sheet metal link pieces, each including a hinged joint comprising integrally formed ears on each link piece, said ears including aligned apertures, the ears formed to overlap portions of an adjacent link piece having a pair of aligned holes therein, and a link connecting pin extending through the apertures and holes to interconnect adjacent links.

7. The apparatus as set forth in claim 5 wherein said links include hinged joints, each joint comprising aligned cylindrical knuckles and a connecting pin.

8. The apparatus as set forth in claim 5 including a manually adjustable base surface-engaging pad on each link for adjusting the vertical position of the support surface segment above the base surface.

9. The apparatus as set forth in claim 5 wherein said track comprises a pair of laterally spaced interconnected track segments, each track segment providing a support surface section for one of each pair of forward and rear support wheels.

10. The apparatus as set forth in claim 9 wherein said carriage includes:

a pair of parallel longitudinal frame members, each mounting a forward and a rear support wheel;

cross members interconnecting said track segments; and, a holddown member mounted on one of said cross members and positioned to engage said longitudinal frame members in response to carriage movement toward the access position.

11. The apparatus as set forth in claim 10 further comprising carriage cross frame members interconnecting said longitudinal frame members and establishing an axial support wheel spacing corresponding to the lateral spacing of said track segments.

12. The apparatus as set forth in claim 9 wherein said support plate comprises a plate section for each track segment.

13. The apparatus as set forth in claim 1 wherein said support plate comprises an extension of said track.

14. An apparatus for supporting and moving individual storage units over a base surface from a stowed densely packed lateral array of such units to a longitudinal access position in which an individual unit is horizontally displaced from the stowed position, said apparatus comprising:

a carriage adapted to support a storage unit for movement along a linear path between the stowed and access positions, said carriage including forward and rear support wheels;

a support plate overlying the base surface and providing a first planar support surface for the carriage support wheels in the stowed position;

a flexible track providing support for said carriage in the access position, said track anchored at one end to a forward end of said support plate;

means for entraining and guiding said track for movement around a forward end of the carriage to lay the track on the base surface in the path of carriage movement toward the access position and to pick up the track from the path of carriage movement toward the stowed position; and, said track defining a second planar support surface, contiguous with said first support surface, for said carriage support wheels in the access position.

15. The apparatus as set forth in claim 14 including lateral connectors joining the support plates of laterally adjacent storage units.

16. The apparatus as set forth in claim 14 wherein:

the carriage support wheels comprise pairs of axially spaced forward and rear support wheels; and, said support plate and said track comprise pairs of longitudinally aligned plate sections and track sections, each defining a support surface section for one of each pair of forward and rear support wheels.

17. The apparatus as set forth in claim 14 including wheel guides on said track positioned to engage lateral edges of the carriage support wheels and prevent deviation thereof from said linear path during carriage movement.

18. The apparatus as set forth in claim 14 including a holddown member mounted on said track and positioned to slidably engage the carriage in response to carriage movement toward the access position and track movement into the path of said carriage movement.

* * * * *